United States Patent
Lai

[19]

[11] Patent Number: 6,089,524
[45] Date of Patent: Jul. 18, 2000

[54] SUPPORTING ASSEMBLY FOR A FISHING ROD ON A BOAT

[76] Inventor: Jung-Tzu Lai, 26, Kuang Fu Rd., Chia Tai Industry Dist., Chia Yi Hsien, Taiwan

[21] Appl. No.: 09/277,943

[22] Filed: Mar. 29, 1999

[51] Int. Cl.[7] .......................... A01K 97/10; A45B 25/28; A47G 25/12; A47G 33/12; H01Q 1/12
[52] U.S. Cl. .................. 248/535; 248/538; 43/21.2
[58] Field of Search ..................... 224/922, 406, 224/553; 248/535, 534, 538, 539; 43/21.2, 54.1

[56] References Cited

U.S. PATENT DOCUMENTS

| | | | |
|---|---|---|---|
| 1,655,914 | 4/1928 | Eck | 43/21.2 |
| 2,540,584 | 2/1951 | Jaycox | 224/922 |
| 2,576,624 | 11/1951 | Miller | 224/922 |
| 2,954,909 | 10/1960 | Miller et al. | 224/922 |
| 3,009,612 | 11/1961 | Fischett | 224/922 |
| 3,154,274 | 10/1964 | Hillcourt | 248/534 |
| 3,259,346 | 7/1966 | Rogers | 248/534 |
| 3,734,439 | 5/1973 | Wintz | 224/406 |
| 3,885,721 | 5/1975 | Vanus | 224/922 |
| 4,641,453 | 2/1987 | Roberts, Sr. | 43/21.2 |
| 4,877,165 | 10/1989 | Behrle | 224/922 |
| 5,054,737 | 10/1991 | DeLancey | 43/21.2 |
| 5,163,652 | 11/1992 | King | 248/538 |
| 5,361,611 | 11/1994 | Hisler | 224/406 |
| 5,752,340 | 5/1998 | Fleener | 43/21.2 |
| 6,003,746 | 12/1999 | Richardson | 224/922 |

*Primary Examiner*—Leslie A. Braun
*Assistant Examiner*—Jon A Szumny
*Attorney, Agent, or Firm*—Larson & Taylor

[57] ABSTRACT

A supporting assembly for a fishing rod on boat includes a base secured to an appropriate location of a boat. A supporting seat is mounted to the base by an inclination-adjusting device to allow adjustment of an inclination angle of the supporting seat relative to the base. A tube is pivotally connected to the supporting seat at a pivotal point. A fishing rod is placed between the tube and the supporting seat with a rear end of the fishing rod extended through the pivotal point so as to be retained in place.

4 Claims, 4 Drawing Sheets

SUPPORTING ASSEMBLY FOR A FISHING ROD ON A BOAT

BACKGROUND OF THE INVENTION

1. Field of the Invention

The present invention relates to a supporting assembly for a fishing rod on a boat to allow easy and rapid disengagement of the fishing rod from the supporting assembly.

2. Description of the Related Art

FIG. 1 of the drawings illustrates a conventional supporting device for a fishing rod on a boat. The supporting device includes a base 91 secured to a side or rail of a boat, a tubular seat 92 mounted to the base 91 and allowing a fishing rod to extend therethrough, and an adjusting knob 93 provided between the base 91 and the tubular seat 92 for adjusting the inclination angle of the tubular seat 92 relative to the base 91, thereby allowing the fishing rod in the tubular seat 92 to be located at an appropriate inclination angle for fishing. When the fishing rod is extended through the tubular seat 92, a retainer 94 is used to retain the fishing rod in place.

When a fish is eating the bait, the fisherman must release the retainer ring 94 immediately so as to hold the fishing rod by hands, yet release of the retainer ring 94 is inconvenient and this motion often causes displacement of the fishing rod and thus scares the fish.

The present invention is intended to provide a supporting assembly for a fishing rod on a boat that mitigates and/or obviates the above problems.

SUMMARY OF THE INVENTION

It is a primary object of the present invention to provide a supporting assembly for a fishing rod on a boat that includes a base secured to a boat at any appropriate location. A supporting seat is adjustably mounted to the base by an inclination-adjusting device to allow adjustment of the inclination angle of the supporting seat. A tube is pivotally connected to the supporting seat. A space provided by the tube and the supporting seat allows insertion of a fishing rod. A rear end of the fishing rod extends through the pivotal point between the tube and the supporting seat, thereby retaining the fishing rod in place for fishing. The front end of the fishing rod can be directly elevated since the tube is pivotable about the supporting seat, thereby allowing immediate response when the fish is eating the bait. Thus, the fishing rod can be lifted to hook the fish and can be removed from the supporting assembly.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
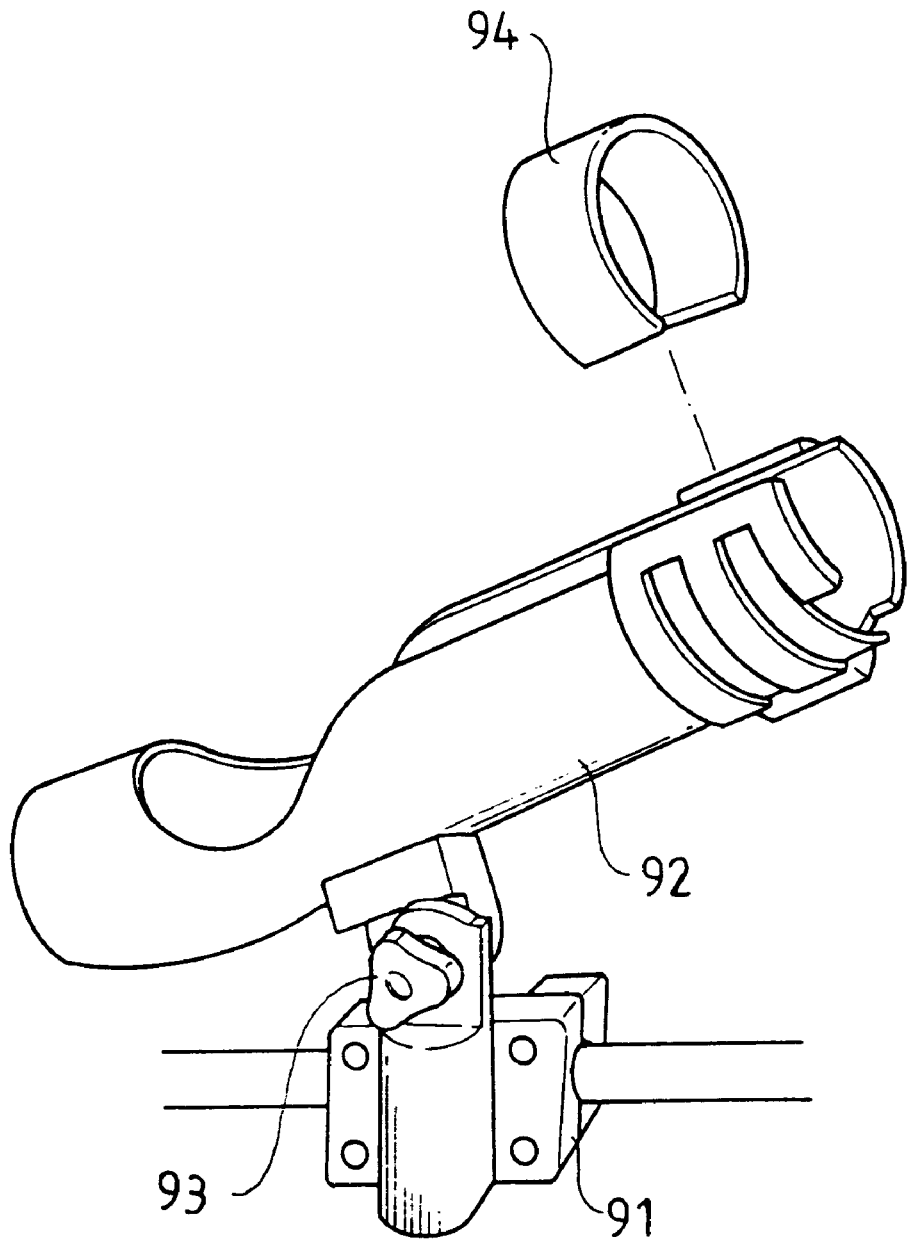
FIG. 1 is an exploded perspective view of a conventional supporting device for a fishing rod on a boat.
Figure 2:
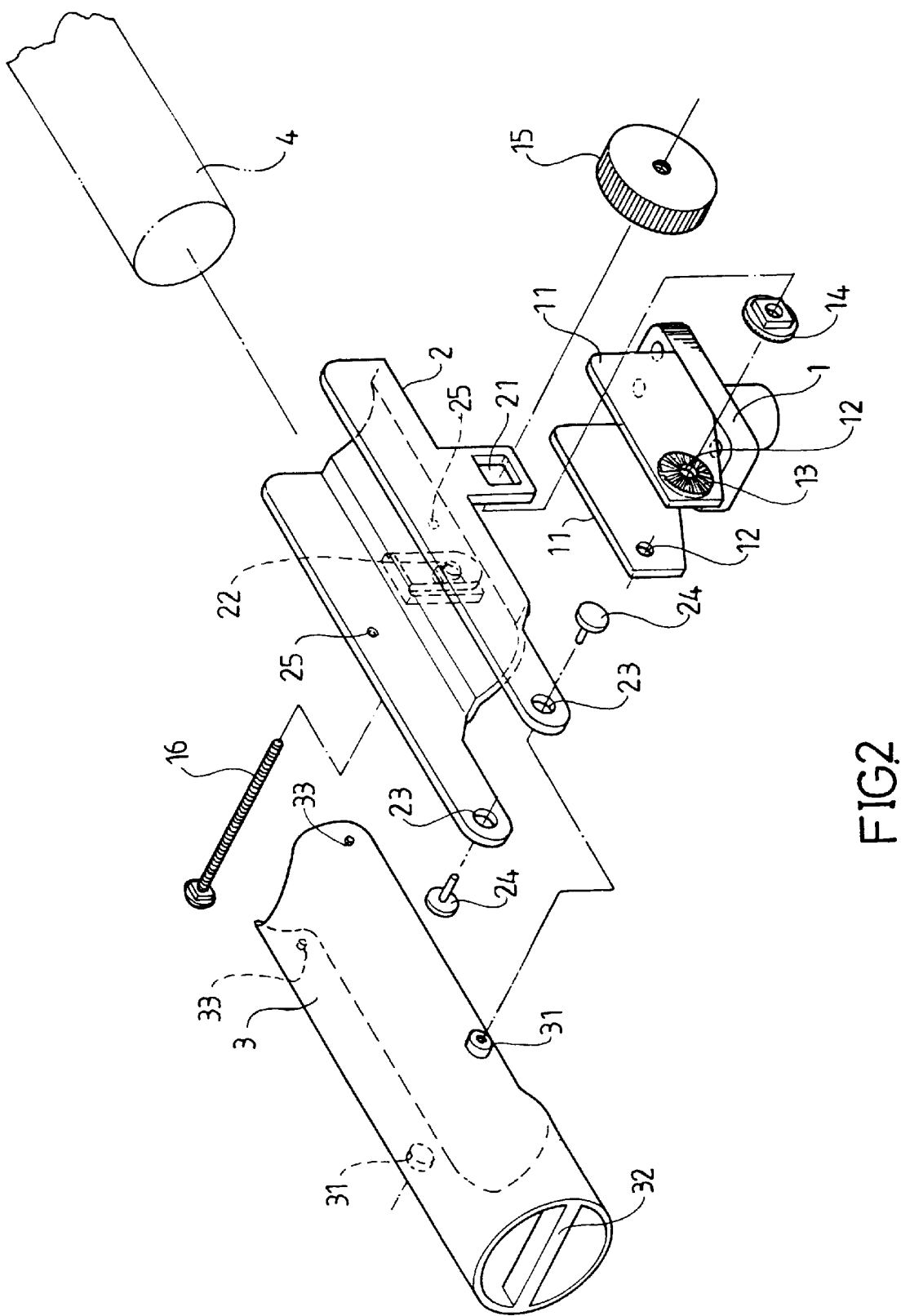
FIG. 2 is an exploded perspective view of a supporting assembly for a fishing rod on a boat in accordance with the present invention.

FIG. 2 illustrates a preferred embodiment of a supporting assembly for a fishing rod on a boat in accordance with the present invention. The supporting assembly includes a base 1, a supporting seat 2, and a tube 3. The base 1 is secured to an appropriate location of a boat by any suitable means. The base 1 includes two spaced walls 11 including aligned holes 12, wherein one hole 12 includes a rugged toothed surface 13 therearound, which will be described later.

The supporting seat 2 includes a bottom (not labeled) and two upright walls (not labeled). Each upright wall includes a downward extension (not labeled), wherein one of the extensions has a non-circular hole 21 for securely receiving a non-circular portion (not labeled) of a gear plate 14 that has a rugged surface (not labeled) for engaging with the rugged toothed surface 13. The other of the extensions has an axle hole 22. A screw rod 16 is extended through the holes 22, 21, and 12 and an adjusting nut 15 is engaged on the screw rod 16. By such an arrangement, the supporting seat 2 may be adjusted to a desired inclination angle relative to the base 1. Nevertheless, the inclination-adjusting device may be replaced by any other known designs. The upright walls of the supporting seat 2 define a space allowing convenient and rapid outward and inward movements of a fishing rod 4. Each upright wall of the supporting seat 2 further includes a depression 25 in an inner side thereof, which will be described later.

The tube 3 is pivotally connected to the supporting seat 2. In this embodiment, each of the upright walls of the supporting seat 2 includes a lug or extension (not labeled) with a hole 23 therein, and the tube 3 includes an axle 31 formed on each of two lateral sides thereof so as to be rotatably received in the hole 23. A pivotal pin 24 is provided to pivotally connect each axle 31 with the hole 23. In addition, a protrusion 33 is formed on an end of each lateral side of the tube 3 so as to be releasably received in an associated depression 25 of the supporting seat 2. A stop 32 is provided in a rear end of the tube 3 to prevent the fishing rod 4 from extending through the rear end of the tube 3.

Figure 3:
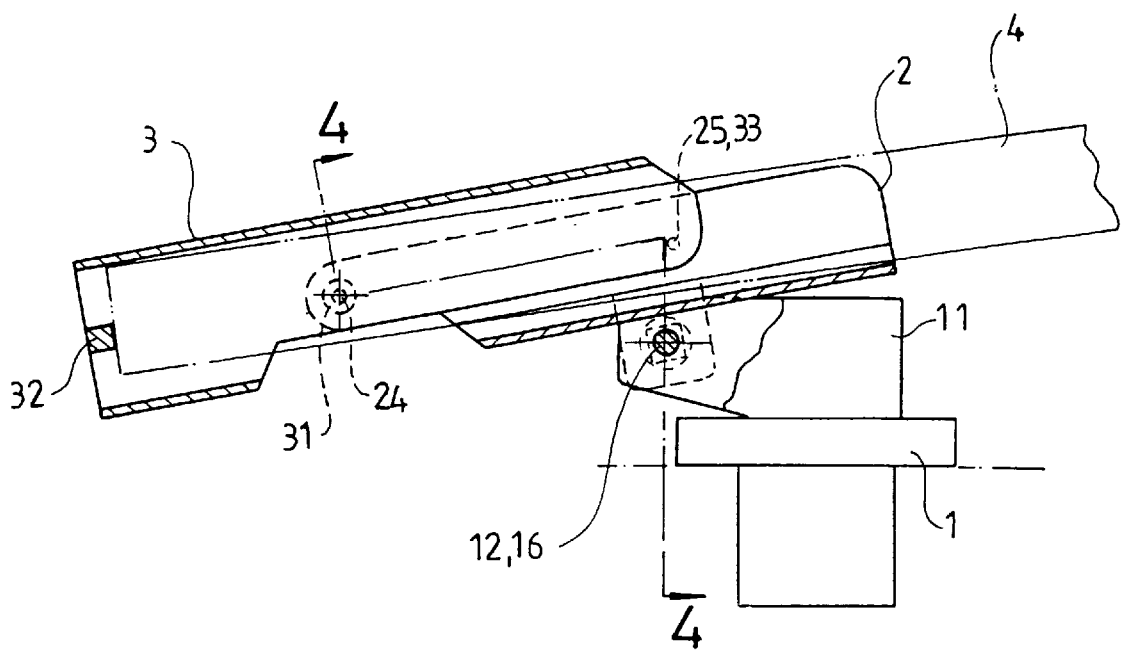
FIG. 3 is a side view, partly sectioned, of the supporting assembly for a fishing rod on a boat in accordance with the present invention.
Figure 4:
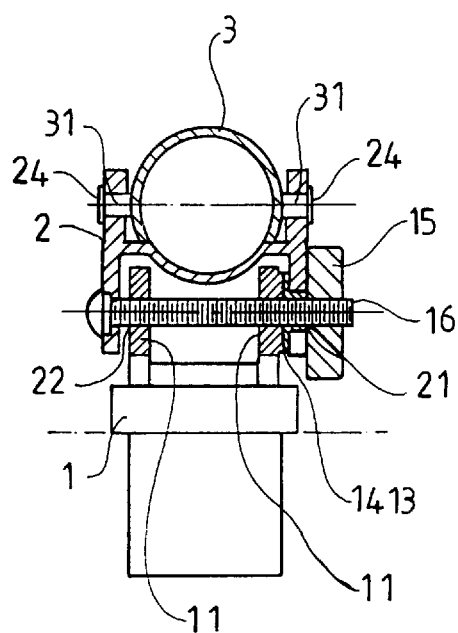
FIG. 4 is a sectional view taken along line 4—4 in FIG. 3.

In use, referring to FIGS. 3 and 4, the supporting seat 2 and the base 1 are engaged by the above-mentioned inclination-adjusting device to make the supporting seat 2 in a desired inclination angle for easy insertion of a fishing rod 4. A rear end of the fishing rod 4 extends through the pivotal point between the tube 3 and the supporting seat 2 and rests against the stop 32 of the tube 3, as best shown in FIG. 3. Thus, the fishing rod 4 is retained in place for fishing.

Figure 5:
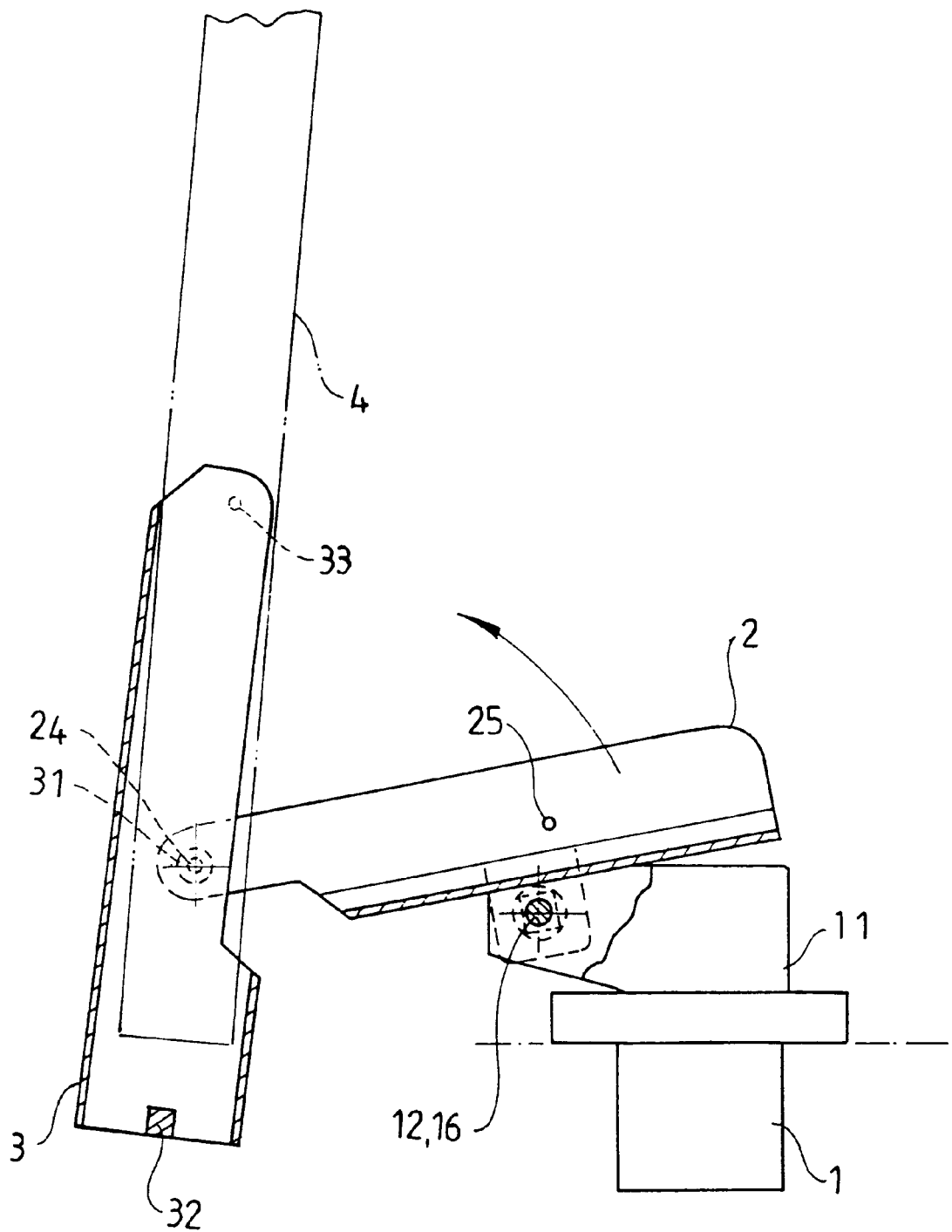
FIG. 5 is a side view, partly sectioned, illustrating operation of the supporting assembly in accordance with the present invention.

Referring to FIG. 5, when the fisherman wants to lift the fishing rod 4, he/she may apply a force to the tube 3 in a location before the pivotal point of the tube 3 relative to the supporting seat 2. As a result, a front end of the fishing rod 4 is elevated without the need of any release actions to the fishing rod 4, such that any interruption or scare to the fish eating the bait will not happen.

Accordingly, the fishing rod resting on the supporting assembly in accordance with the present invention can be lifted conveniently and quickly without any further release actions to the fishing rod. Thus, the fishing rod will not be improperly displaced to scare the fish eating the bait.

Although the invention has been explained in relation to its preferred embodiment, it is to be understood that many other possible modifications and variations can be made without departing from the spirit and scope of the invention as hereinafter claimed.

What is claimed is:

1. A supporting assembly for a fishing rod on a boat, the supporting assembly comprising:

a base;

a supporting seat mounted to the base by an inclination-adjusting device to allow adjustment of an inclination angle of the supporting seat relative to the base, the supporting seat including a bottom adapted to support a portion of the fishing rod; and a tube pivotally connected to the supporting seat at a pivotal point, the tube adapted to receive a rear portion of the fishing rod with a rear end of the fishing rod extendible through the pivotal point, wherein the support seat includes two upright walls each having a depression in an inner side thereof, and wherein the tube includes a protrusion formed on each of two lateral sides thereof so that each protrusion is releasably received in an associated depression.

2. The supporting assembly for a fishing rod on a boat as claimed in claim 1, wherein the inclination-adjusting device includes a screw rod extended through the base and the supporting seat, and an adjusting nut engaged on the screw rod, each of the base and the supporting seat including a rugged surface in a contact area therebetween, the adjusting nut being rotatable to control engagement and disengagement of the rugged surfaces of the base and the supporting seat.

3. The supporting assembly for a fishing rod on a boat as claimed in claim 2, wherein the supporting seat includes a non-circular hole, and further comprises a gear plate with a non-circular portion securely received in the non-circular hole, the gear plate including the rugged surface on the supporting member.

4. The supporting assembly for a fishing rod on a boat as claimed in claim 1, wherein the tube includes a stop in a rear end thereof on which said stop the rear end of the fishing rod is adapted to rest.

* * * * *